May 27, 1969

W. E. CORY ET AL 3,446,298

WEIGHING APPARATUS

Filed Oct. 17, 1966

INVENTORS
William E. Cory
Melvin A. Schrader

BY Hastings Ackley
and
Walter J. Jagmin
ATTORNEYS

INVENTORS
William E. Cory
Melvin A. Schrader

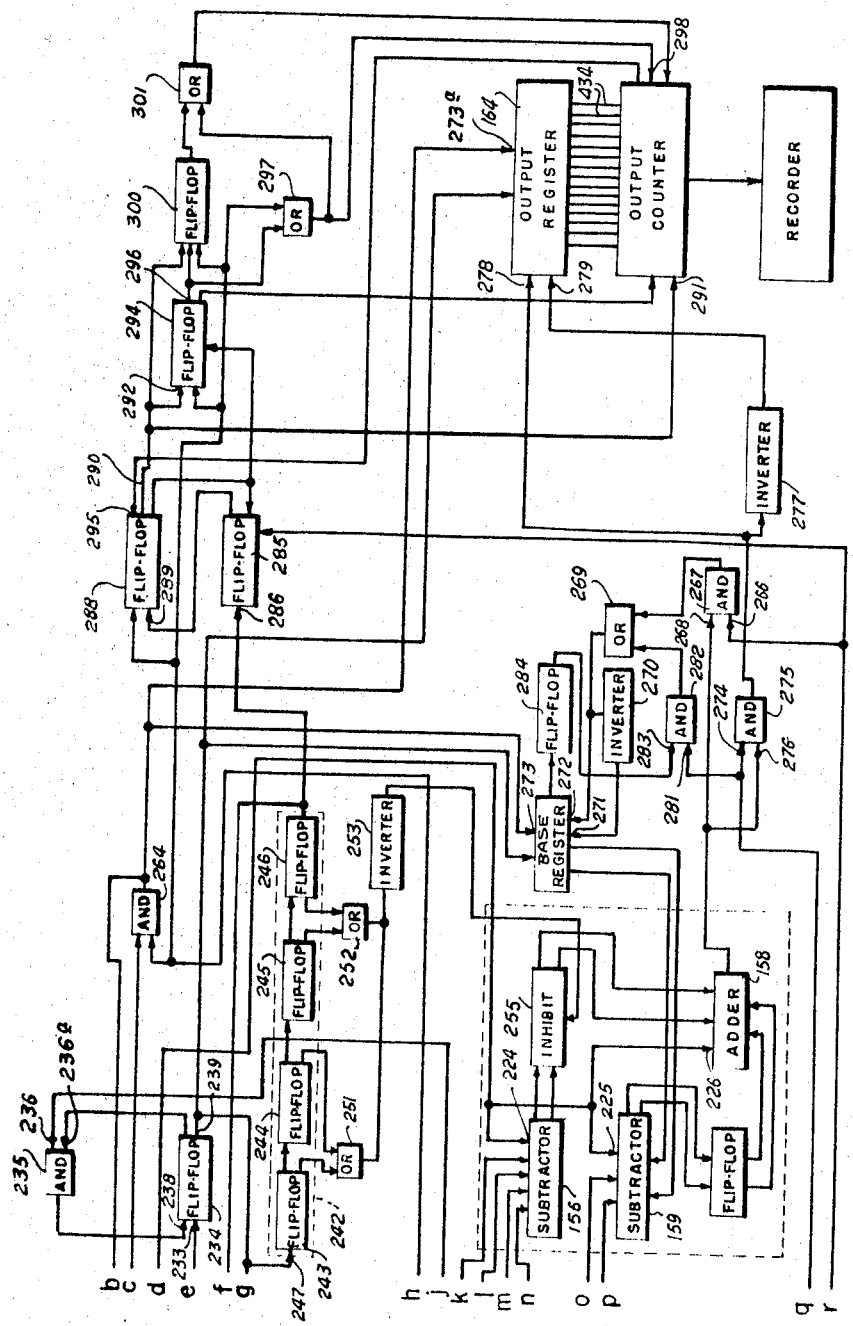
Fig. 9-A

United States Patent Office 3,446,298
Patented May 27, 1969

3,446,298
WEIGHING APPARATUS
William E. Cory and Melvin A. Schrader, San Antonio, Tex., assignors, by mesne assignments, to Sands Measurement Corporation, Dallas, Tex., a corporation of Texas
Filed Oct. 17, 1966, Ser. No. 587,145
Int. Cl. G01g 23/38
U.S. Cl. 177—7                                    15 Claims

ABSTRACT OF THE DISCLOSURE

A weighing apparatus for weighing moving loads which includes a beam supported at longitudinally spaced locations, a plurality of sensor means spaced along the beam for measuring the strain of the beam due to the vertical force applied to the beam by a load as it moves thereover, the strain gauges being connected in a sensing circuit to produce a signal which varies in accordance with the strain or deflection of the beam while the load is at a predetermined location along the beam.

---

This invention relates to weighing apparatus and more particularly to weighing apparatus for producing an electric signal which varies in accordance with a load to be weighed and to a means and method for determining the true value of an electric signal voltage regardless of perturbations imposed on the signal voltage by extraneous forces.

An object of this invention is to provide a new and improved apparatus for weighing moving loads having a beam supported at longitudinally spaced locations and means for measuring the strain or deflection of the beam as the load moves over the beam.

Another object is to provide a weighing apparatus wherein the means for measuring the strain or deflection of the beam includes a plurality of sensor means, such as strain gauges, spaced along the beam for measuring the strain or deflection of the beam due to the vertical force applied to the beam by the load as it moves over the beam, the strain gauges being connected in a sensing circuit to produce a signal voltage which varies in accordance with the strain or deflection of the beam while the load is at a predetermined location along the beam.

Still another object is to provide a weighing apparatus having means for determining the true value of the signal voltage regardless of the perturbations in the signal voltage caused by extraneous forces exerted on the beam.

A further object is to provide a weighing apparatus having means for obtaining a base or no load digital value which corresponds to the base voltage output of the circuit immediately prior to the movement of the load onto the beam, for obtaining a digital load value which corresponds to the load value of the signal voltage as the load moves over the beam and for subtracting the base digital value from the digital load value to obtain an output digital value which indicates the weight of the load.

A still further object is to provide a weighing apparatus having means for determining the maximum and minimum digital values of the signal voltage during the movement of a load over a predetermined location on a beam, determining the difference between the maximum and minimum values, and adding one-half of this difference to the minimum value or subtracting one-half of this difference from the maximum value to obtain a digital value which has eliminated therefrom the effects of any extraneous perturbations imposed on the signal voltage and which is the median value of the signal voltage during the period of time during which the load is moving over the predetermined location.

A still further object is to provide a weighing apparatus wherein the base digital value of the signal voltage is also obtained by determining the difference between the highest and lowest digital values of the signal voltage immediately prior to the movement of the load onto the weigh rail and then adding one-half of the difference to the minimum value or subtracting one-half of the difference from the maximum value to obtain the true digital value of the base signal voltage.

Another important object of the invention is to provide a weighing apparatus wherein the signal voltage output of the sensing circuit is transmitted to an analog-to-digital converter whose output during a predetermined finite time immediately prior to the movement of the load onto the weigh rail is transmitted to maximum and minimum registers through associated comparators to store digital values in the registers representing the maximum and minimum values of the sensing circuit voltage output during such predetermined finite time, the minimum value stored in the minimum register is then subtracted from the maximum value stored in the maximum register to determine the difference between the maximum and minimum values, and one-half of the difference is then added to the minimum value to obtain the base digital value which is then stored in a base or no load register.

Still another object is to provide a weighing apparatus wherein during the movement of the load over a predetermined portion of the weigh rail, the signal voltage output is transmitted to the analog-to-digital converter whose output is transmitted to the maximum and minimum registers through their associated comparators, the true load digital value of the load signal voltage is determined by subtracting the maximum load digital value from the minimum load digital value, one-half of the difference is added to the minimum load digital value to obtain a digital value which accurately indicates the weight of the load, and the base digital value stored in the base register is then subtracted from the base load digital value to obtain the actual digital value representing the weight of the load.

A further object of the invention is to provide a means for determining the true value of a signal voltage which is subject to extraneous perturbations.

Another object is to provide a means for determining the maximum and minimum digital values of a signal voltage during a predetermined period of time, determining the difference between the maximum and minimum value to obtain a digital value corresponding to the true value of the signal voltage.

Still another object is to provide a new and improved method of determining the true digital value of a signal voltage subject to extraneous perturbations which comprises the steps of determining the maximum and minimum values of the signal voltage during a predetermined period of time, determining the difference between the maximum and minimum values, and then adding one-half of the difference to the minimum value.

Additional objects and advantages of the invention will be readily apparent from the reading of the following description of a device constructed in accordance with the invention, and reference to the accompanying drawings thereof, wherein.

Figure 1:
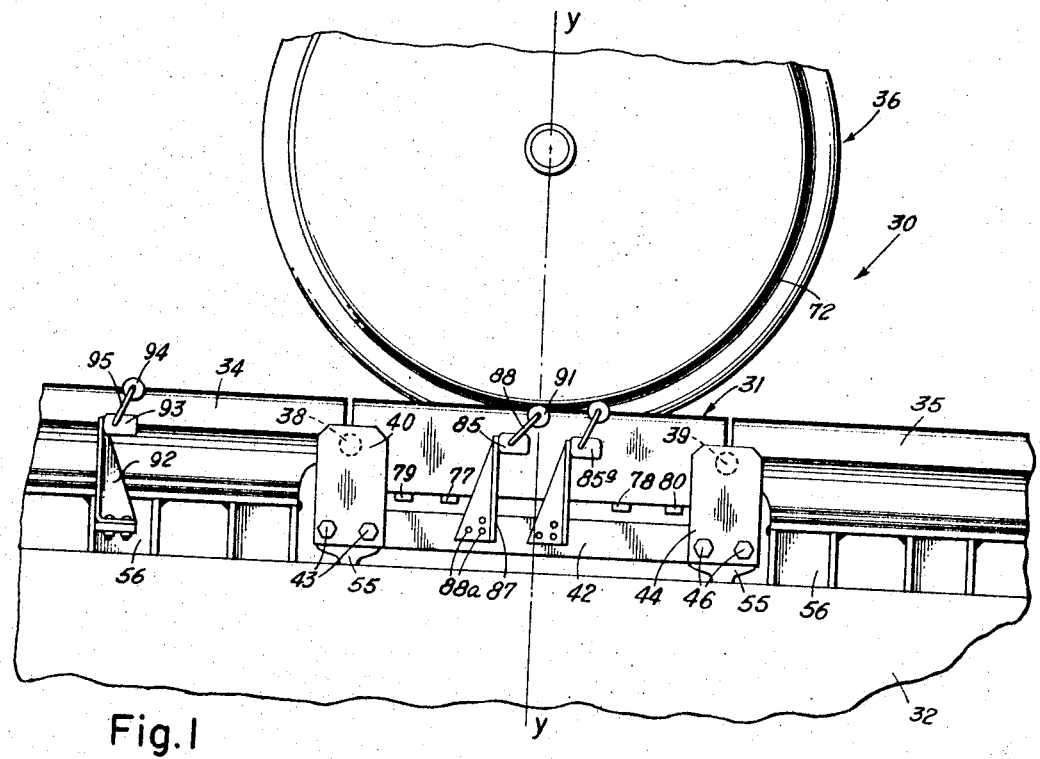
FIGURE 1 is a side elevation of a weighing apparatus embodying the invention showing the weighing beam as a weigh rail constituting a section of a track rail and showing the wheel of a railroad vehicle as it moves over the weigh rail.
Figure 2:
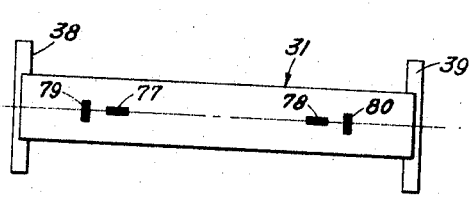
FIGURE 2 is a diagrammatic illustration showing the locations of load sensing strain gauges and temperature compensating strain gauges secured to the bottom surface of the beam.
Figure 3:
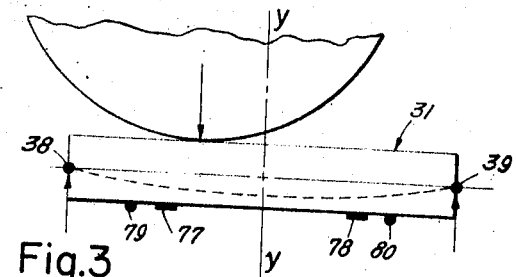
FIGURE 3 is a diagrammatic illustration of the beam of FIGURE 1 showing the vertical deflection of the neutral axis of the beam as the wheel rolls therealong.
Figure 4:
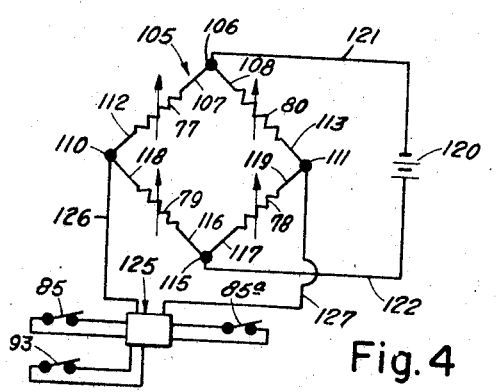
FIGURE 4 is a diagrammatic illustration of an electric circuit including the strain gauges of the beam connected to form a network bridge or sensing circuit whose output varies in accordance with the strain in the beam at the points of location of the strain gauges as the load rolls therealong.

Referring now particularly to FIGURE 1 of the drawings, the weighing apparatus 30 may be substantially similar to the one described and illustrated in the United States Letters Patent to Seymour H. Raskin, No. 3,155,184, issued Nov. 3, 1964. In brief, such weighing apparatus may include a weigh rail or beam 31 mounted on a rigid foundation 32 which may be of concrete or other suitable material. The weigh rail extends between adjacent spaced ends of the sections 34 and 35 of a track rail along which the wheel 36 may roll. The weigh rail or beam 31 has a pair of horizontal support pins 38 and 39 rigidly secured thereto as by welding. Opposite end portions of the pin 38 extend into suitable bearings of a pair of pillow blocks 40 rigidly secured to opposite sides of a base plate 42 in any suitable manner as by means of bolts 43. The opposite end portions of the pin 39 similarly extend into suitable bearings of the pillow blocks 44 rigidly secured to opposite sides of the base plate 42 by means of bolts 46. The support pins 38 and 39 are thus rotatably mounted in the pillow blocks to permit free downward deflection of the beam as the load moves across its upper load bearing surface or tread. The base plate 42 may be mounted on suitable beams 55 whose lower portions are embedded in the foundation 32. The track rails 34 and 35 may be secured to the top ends of vertical I-beams 56 whose lower end portions are embedded in the concrete base and whose upper end portions extend above the upper surface of the concrete base. The upper surfaces of the track rails provide load supporting surfaces or treads which are positioned in exact alignment with the tread or support surface of the weigh rail so that a wheel rolling from one rail, for example, from the track rail 34 onto the weigh rail, will not be displaced either vertically or transversely since the treads or load supporting surfaces of the rails are in exact alignment. The weigh rail may be of any suitable or sectional configuration, as for example, the substantially rectangular configuration illustrated in the patent to Seymour H. Raskin, No. 3,155,184, or the configuration of the weigh rail illustrated in the copending application of Seymour H. Raskin, Ser. No. 508,301, filed Nov. 17, 1965. If desired, of course, the particular mounting of the weigh rail to the base may be that shown in the copending application instead of the particular mounting shown in the patent.

Whether the weigh rail is mounted in the manner illustrated in the patent or in the copending application, a pair of strain sensing devices such as the strain gauges 77 and 78 are bonded in any suitable manner to the planar bottom surface of the weigh rail and their electrical resistances vary directly as the strain of the weigh rail at the points at which the load sensing strain gauges are secured to the weigh rail due to the longitudinal elongation of the bottom of the rail due to its downward bending. The load sensing strain gauges 77 and 78 are preferably spaced equally from the mid-point or central vertical axis YY of the span of the beam or weigh rail 31. An additional pair of temperature compensating strain gauges 79 and 80 are also bonded to the bottom surface 75 of the weigh rail whose electrical resistances decrease as the rail bends downwardly during the passage of the load thereover and the transverse width of the rail at the points of location of the strain gauges decreases in accordance with Poisson's ratio. The manner in which the strain gauges 79 and 80 compensate for the variations in the strain imposed on the load sensing strain gauges 77 and 78 due to contraction and expansion of the weigh rail with changes in temperature is fully explained in the United States Letters Patent No. 3,155,184.

A pair of microswitches 85 and 85a rigidly secured to one side of the base plate 42 by means of the support brackets 87, whose lower ends are rigidly secured to the base plate by means of the bolts or screws 88a, have operator rods 88 on which are rotatably mounted rollers 91. The rollers extend upwardly into the path of travel of the rim 72 of the wheel 36 laterally outwardly of the weigh rail and are engaged thereby to close the microswitches sequentially as the point of the contact of the wheel with the weigh rail moves along its path of movement as the wheel moves past predetermined spaced locations.

A microswitch 93 is secured to an I-beam 56 by a suitable bracket 92 and the roller 94 on its operator rod 95 extends upwardly into the path of travel of the rim 72 of the wheel 36 over the track rail 34 prior to the its movement onto the weigh rail and is engaged thereby to close the switch as the point of contact of the wheel with the track rail moves past a predetermined location along its path of movement on the track rail.

The strain gauges are connected to form a bridge network or sensing circuit 105, one side of each of the strain gauges 77 and 80 being connected to one input terminal 106 of the bridge network by the conductors 107 and 108, respectively and their other sides being connected to the output terminals 110 and 111 of the bridge network by the conductors 112 and 113, respectively. Similarly, one side of each of the strain gauges 79 and 78 is connected to the input terminal 115 by the conductors 116 and 117, and their other sides are connected to the output terminals 110 and 111 by the conductors 118 and 119, respectively. The input terminals 106 and 115 are connected to opposite sides of a suitable source of direct current, such as the battery 120, by the conductors 121 and 122, respectively. The output terminals of the bridge network are connected to a computer 125 by the conductors 126 and 127, respectively.

Figure 5:
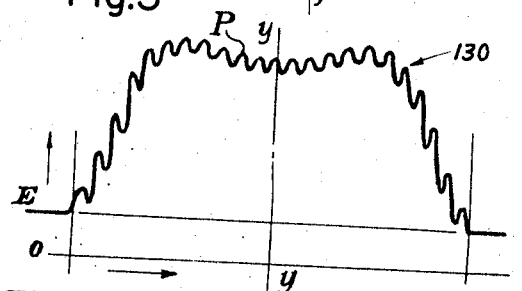
FIGURE 5 is an illustration of the actual signal voltage output of the sensing circuit of FIGURE 4 due to the variations in the resistances of the strain gauges as the load rolls along the beam and showing extraneous perturbations of the signal voltage.

The signal voltage output of the bridge network 105 due to the combined effects of the four strain gauges as a wheel rolls over the weigh rail takes the form illustrated by the curve 130 in FIGURE 5. It will be noted that the bridge network provides an output voltage which may be called a base voltage when no load is present on the beam, that the voltage rises as the load moves onto the rail from the track rail 34 and then during a substantial portion of the movement of the wheel on either side of mid-point of the span of the beam is substantially uniform or constant but may have perturbations P imposed thereon due to extraneous forces exerted on the weigh rail, and that the voltage then decreases until the wheel moves off the weigh rail and onto the track rail back to the base voltage. It is necessary that the effect of such perturbations on the base voltage and the load voltage output of the sensing circuit be eliminated or compensated if the weight of the load is to be determined with great accuracy.

Figure 6:
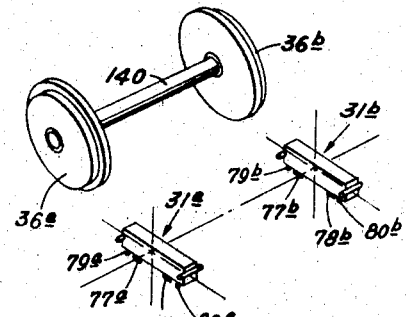
FIGURE 6 is a schematic illustration showing the manner in which a pair of wheels connected to one axle of the vehicle, such as a railway car, move simultaneously over a pair of weigh rails of a weighing apparatus embodying the invention, the weigh rails constituting sections of a pair of track rails.
Figure 7:
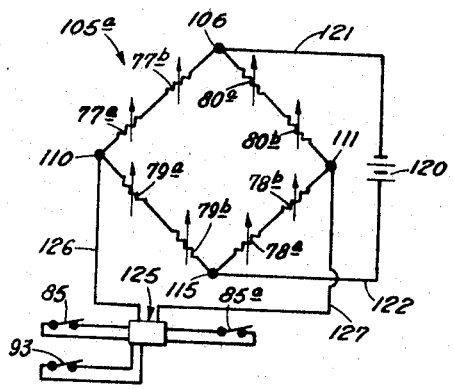
FIGURE 7 is a schematic illustration showing the manner in which the strain gauges of the weigh rails illustrated in FIGURE 6 are connected to form a sensing circuit which provides an output voltage which varies in accordance with the load imposed on the weigh rails as the wheels roll thereover.

FIGURES 6 and 7 show the manner in which two weigh rails 31a and 31b, each identical in structure to the weigh rail 31 illustrated in FIGURE 1, may be similarly mounted between the spaced ends of adjacent adjoining sections of the usual pair of parallel track rails to simultaneously measure the weight of the load carried by the usual pair of wheels 36a and 36b of a vehicle mounted on a common axle 140. The wheels 36a and 36b move in parallel alignment across the two weigh rails since the axis of the axle 140 is parallel to the transverse axis ZZ of the weigh rails. Since the points of contacts of the two wheels with their respective weigh rails will be at the same longitudinal locations along the tracks at substantially the same time, the switch 93 actuated by one of the wheels will cause the computer device to translate the base voltage output of the sensing circuit as the wheels approach the weigh rail into a base digital data or value and that the switches 85 and 85a will be actuated sequentially thereafter by such wheel to cause the computer device to translate the load voltage output of the sensing circuit during the time the wheels are moving along the weigh rails between the two switches 85 and 85a from a location substantially at the mid-points of the spans of the beams or slightly beyond the mid-points of the spans of the beams and a location a predetermined distance from such midpoints toward the track rail 35 into load digital data or value.

Figure 8:
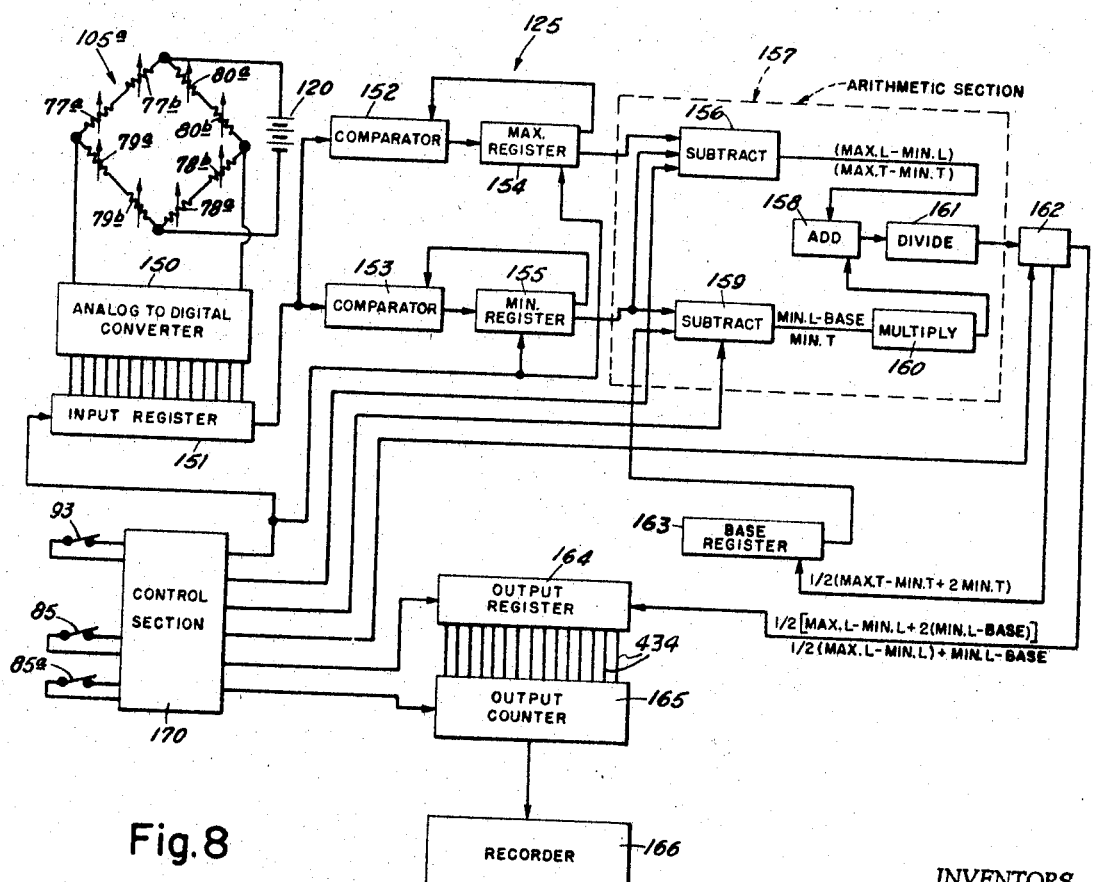
FIGURE 8 is a block diagram illustrating the overall circuit of the apparatus.

Referring now particularly to FIGURE 8 of the drawings, the computer device 125 for translating the output voltage of the sensing circuit, as a pair of railroad car wheels 36a and 36b mounted on a common axle 140 roll over a pair of parallel aligned weigh rails 31a and 31b, into a recorded weight of the load imposed by the wheels on the weigh rails includes an analog-to-digital converter 150 which converts the output voltage of the sensing circuit into digital data or value, a fifteen bit parallel input, serial output input register 151 into which the output of the converter is clocked periodically during a first or base period Tt of time after the actuation of the switch 93 and then during a second or load period of time Lt between the sequential actuations of the switches 85 and 85a. The serial output of the input register, during the base and load periods of time between the converter data entry periods of time is transmitted to a maximum comparator 152 and a minimum comparator 153. The comparator 152 compares the digital data or value output of the input register with the digital data or value stored in a maximum register 152, having both a shift left and shift right capability, and if the data from the input register is greater than the data in the maximum register, the comparator replaces the data in the maximum register with such greater data. If the output of the input register is smaller that the data in the maximum register, the data of the maximum register is recirculated into the maximum register. Similarly, the comparator 153 compares the output data of the input register with the data from a minimum register 155, also having a shift left and a shift right capability, and if the data in the input register is smaller than the data in the minimum register, the computer replaces the data in the minimum register with such smaller data from the input register. If the data from the input register is greater, the data from the minimum register is recirculated into the minimum register.

After the base period of time Tt after the actuation of the switch 93 by a wheel 31 as it rolls along a track rail 34 towards the weight rail, the maximum base data, Max. T., and the minimum base data, Min. T., stored in the maximum and minimum registers, respectively, during the base period of time, are transmitted to a first subtracter 156 of an arithmetic section 157 of the computer device. The first subtracter subtracts the minimum base digital value or data, Min. T., from the maximum digital value or data, Max. T., and this output (Max. T.—Min. T.) of the subtracter is transmitted to an adder 158. Also, upon the actuation of the switch 93, the data from a base register 163 which during the base period of time is of zero value, is subtracted by a second subtracter 159 from the minimum value or data (Min. T.) stored in the minimum register so that upon the termination of the base period, the output of the second subtracter (Min. T—0)

is the digital value, Min. T.

The output of the second subtracter is transmitted to a multiplier 160 where it is multiplied by two and this two minimum base output (2 Min. T.) of the multiplier is then added in the adder 158 to the output of the first subtracter 156. The output of the adder (Max. T. minus Min. T. plus 2 Min. T.) is transmitted to a divider 161 where it is divided by two. The output of the divider, ½ (Max. T. minus Min. T. plus 2 Min. T.) or ½ (Max. T. plus Min. T.) is transmitted through a suitable control 162 to the base register 163. As a result, immediately prior to the actuation of the switch 85, the base register has stored therein the digital data or value, ½ (Max. T. minus Min. T.) or BASE which corresponds to the true no load or base value of the voltage output of the sensing circuit.

As the wheels then roll over the weigh rails, during the load period of time Lt between the sequential actuations of the switches 85 and 85a, the output of the analog-to-digital converter is clocked periodically into the input register, the maximum load digital data or value, (Max. L.) corresponding to the maximum value of the voltage output of the sensing circuit during the load period of time Lt is stored in the maximum register 154, and the minimum load digital data or value (Min. L.) corresponding to the minimum value of the voltage output of the sensing circuit during the load period of time is stored in the minimum register.

Upon the actuation of the switch 85a, the data, Min. L., in the minimum register is subtracted by the subtracter 156 from the data, Max. L., stored in the maximum register and this difference is transmitted from the subtracter 156 to the adder 158. The base digital value BASE stored in the base register is subtracted by the second subtracter 159 from the minimum load digital value, Min. L., stored in the minimum register 155. The result of this subtraction (Min. L. minus BASE) is transmitted to the multiplier 160 which multiplies it by two the result of this multiplication 2 (Min. L. minus BASE) is then added by the adder 158 to the result of the subtraction performed by the subtracter 156 (Max. L. minus Min. L.). The result of this addition (Max. L. minus Min. L.) plus 2 (Min. L. minus BASE) is divided by two by the divider 161. The data from the divider ½ (Max. L. minus Min. L.) plus 2 (Min. L.

minus BASE) is then transmitted by a control circuit 162 to a serial input, parallel output register 163. The digital value or data transmitted to the output register is the true digital value or data corresponding to the weight of the load imposed on the weigh rails during the movement of the wheels over the weight rails.

The output of the output register is then transmitted to a parallel input, serial output counter 164 whose output is serially clocked down to zero to a recorder or printer which prints out the weight of the load.

The sequence of operations of the various components of the computer device 125 is controlled by its control or logic section 170 which supplies the required clock inputs to the various components of the computer device, causes the output of the analog-to-digital converter to be stored in the input register periodically both during the base and load periods of time, causes the digital data from the input register to be transmitted to the comparators during the intervals of time between the periods during which the output of the converter is being stored in the input register, upon completion of either the load or base periods of time causes the arithmetic section to perform the arithmetic functions described, at the end of the base period of time causes the output of the arithmetic section to be stored in the base register and at the end of the load period of time causes the output of the arithmetic section to be transmitted to the output register, causes the data in the output register to be transmitted to the output counter, and finally causes the output of the output counter to be transmitted to a recorder or printer which records or prints the weight of the load.

Figure 10:
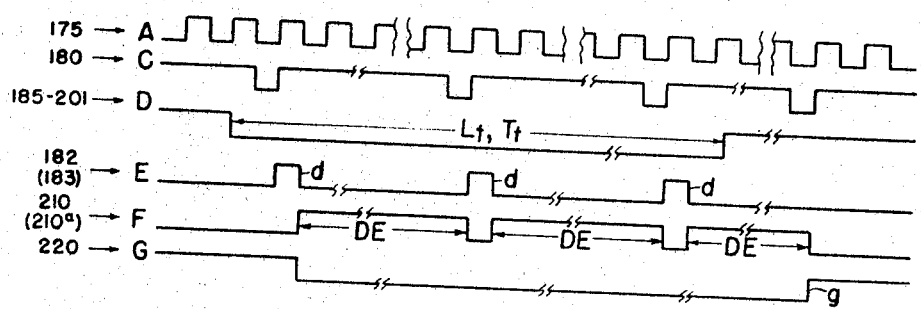
FIGURES 10, 11 and 12 illustrate the waveforms and time relationship of the outputs of various components of the apparatus, the time scale of FIGURE 10 being greater than that of FIGURES 11 and 12.
Figure 11:
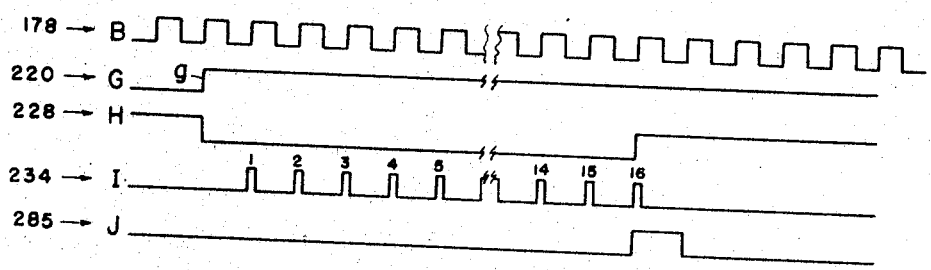
Figure 12:
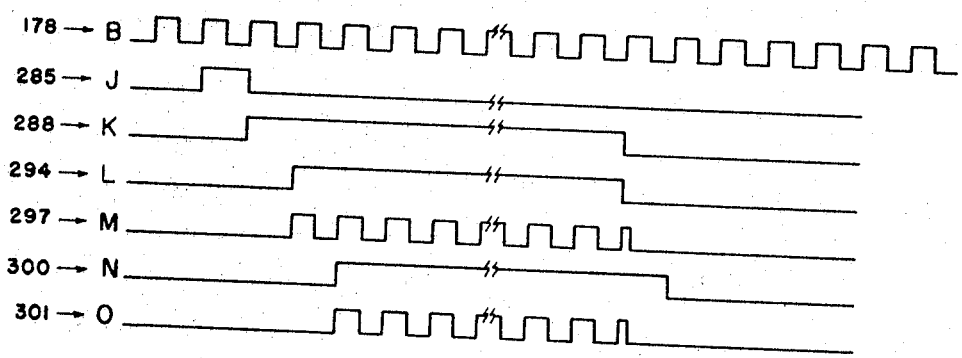

The clock 170 provides three outputs a first 800 kilocycles per second basic output, having the wave form A illustrated in FIGURE 10 to an output conductor 172, a second 100 kilocycle per second output, having the wave form B illustrated in FIGURES 11 and 12, to an output conductor 173, and a third 50 kilocycle per second output, having the wave form C illustrated in FIGURE 10, to the output conductor 174. The third output is in the form of negative going pulses of the same period as the 800 kilocycle pulses so that fifteen 800 kilocycle pulses occur between successive pulses of the 50 kilocycle output.

The clock 170 may be of any suitable form and may for example include an 800 kilocycle per second free running multivibrator 175, three flip-flops 176, 177 and 178 and an and gate 179 which are interconnected to constitute and N/8 binary counter and thus provide a 100 kilocycle per second output having the wave form B. The 400 and 200 kilocycle outputs of the flip-flops 176 and 177, respectively, are transmitted to the and gate 179 whose output is transmitted to the reset circuit of the flip-flop 178 which is clocked by the 800 cycle output of the multivibrator 175. The fourth flip-flop 179a is clocked by the 100 kilocycle output of the flip-flop 178 and thus constitutes a N/2 binary counter. The 50 kilocycle output of the flip-flop 179a, the 200 kilocycle output of the and gate 179, and the 100 kilocycle output of the flip-flop 178 are transmitted to an and gate 180. Due to the timing of the pulse outputs of the and gate 179 and of the flip-flops 178 and 179a, the output of the and gate 180 has the wave form C and the relationship to the 800 kilocycle output of the multivibrator illustrated in FIGURE 10.

During a predetermined period of time Tt after the momentary opening of the switch 93 and also during the period of time between the successive momentary openings of the switches 85 and 85a, a flip-flop 182 transmits a data entry control pulse or gate signal having the wave form E, FIGURE 10, through its output conductor 183 to the input register to cause the output of the analog-to-digital converter to be inserted into the input register which is clocked by the 800 kilocycle output of the clock. The opening of the switch 93 causes the square wave output of a squaring amplifier 184 to be transmitted to a one shot multivibrator 185 whose output is a square wave of predetermined duration. The opening of the switch 93 removes a negative voltage blocking bias of an input circuit 186 from the squaring amplifier to cause it to transmit a square wave pulse to the multivibrator 185. The output of the one shot multivibrator is transmitted to one input terminal 190 of an and gate 191. The 50 kilocycle output of the clock is transmitted to the other input terminal 192 of the and gate 191. The and gate 191 during the predetermined period of time after the momentary opening of the switch 93 permits the 50 kilocycle output of the clock to be transmitted through an or gate 194 to the set input terminal 195 of the flip-flop 182 to whose clock input terminal 196 is transmitted the 800 kilocycle output of the clock.

The flip-flop 182 provides a control pulse or gate signal from its output terminal 183 to the gate control terminal 198 of the input register 151, having the wave form E illustrated in FIGURE 10, during the period of time of operation of the one shot multivibrator whose output has the wave form D, FIGURE 10.

It will thus be apparent that during the predetermined period of time Tt after the momentary opening of the switch 93, the output of the analog-to-digital converter is inserted periodically into the input register during the pulses d of the output of the flip-flop 182 of 800 kilocycle period which occur at a 50 kilocycle frequency.

The opening of the switch 85 turns on a flip-flop 201 and the opening of the switch 85a turns it off by changing the biases applied to the usual transistors of the flip-flop. During the time the flip-flop 201 is turned on, its output is transmitted to one input terminal 202 of an and gate 203 to whose other input terminal 204 is transmitted the 50 kilocycle output of the clock. The output of the and gate 203 is transmitted through the or gate 194 to the input terminal 195 of the flip-flop 182 so that during the period of time Lt between the momentary actuation of the switches 85 and 85a, the flip-flop 182 transmits periodically control pulses or gate signals d to the input register to cause the output of the analog-to-digital converter to be inserted in the input register in the same manner as during the operation of the one shot multivibrator 185.

Shift left control or gate signals having the wave form F, FIGURE 10, are transmitted to the shift left terminals 207, 208 and 209 of the input, maximum and minimum registers, respectively, by a flip-flop 210 during the data entry periods of time DE between the periods of time during which the output of the converter is inserted into the input register. The 800 kilocycle output of the clock is transmitted to the clock input terminals 211 of the flip-flop 210, its set input terminal 212 is connected to the other output terminal 183a of the flip-flop 182 and the 50 kilocycle output of the clock is transmitted to its reset terminal 213.

A flip-flop 220, to whose clock input terminal 221 the 50 kilocycle clock output is transmitted, is set at the first 50 kilocycle clock pulse received after the pulse output of either the one shot multivibrator 185 or the flip-flop 201 is received and is reset at the first 50 kilocycle clock pulse received after the signal from the one shot multivibrator or of the flip-flop 201 terminates to provide a pulse output of the wave form G illustrated in FIGURES 10 and 11. The output of the flip-flop 220 is employed to prevent operation of the subtracters and adders during the period of the pulse output of the flip-flop 220 and to terminate shift left operations of the registers. Immediately upon the reset of the flip-flop 220, as indicated at g in FIGURES 10 and 11, the shift left operations are terminated and the data from the maximum and minimum registers is shifted right to the arithmetic section.

The output of the one shot multivibrator is transmitted through the or gate 222 to the reset input terminal 223 of the flip-flop and similarly the output of the flip-flop 201 is transmitted to the reset input terminal 223 of the flip-flop through the or gate 222.

The output of the flip-flop 220 is transmitted to the terminals 224, 225 and 226, respectively, of the subtracters 156 and 159 and the adder 158. The output of the flip-flop 220 is transmitted to the set input terminal 227 of a flip-flop 228 whose output having the wave form H, FIGURE 11, is transmitted to one input terminal 229 of an and gate 230 to whose other input terminal 231 is supplied the 100 kilocycle clock output. The flip-flop 228 is turned on when the flip-flop 220 is turned off. The 100 kilocycle output of the and gate 230 during the time that the flip-flop 228 is turned on is transmitted to one input terminal 233 of a flip-flop 234. One output terminal of the flip-flop 234 is connected to one input terminal 236a of an and gate 235 to whose other input terminal 236 is transmitted the 800 kilocycle output of the clock. The output of the and gate is transmitted to the set input terminal 238 of the flip-flop 234 during the period the flip-flop 228 is turned on so that the output of the flip-flop 234 at its output terminal 239, during the period that the flip-flop 228 is turned on, is sixteen shift right pulses of the wave form I illustrated in FIGURE 11, which are transmitted to the base, minimum maximum and output registers.

The flip-flop 228 is turned off after the flip-flop 234 produces sixteen output pulses by a pulse transmitted to its reset input terminal 240 from an N/16 binary counter 242 which include four flip-flops 243, 244, 245 and 246. The output terminal 239 of the flip-flop 234 is connected to the input terminal 2 and 7 of the first flip-flop 243 and the output terminal of the fourth flip-flop 246 is connected to the reset input terminal 240 of the flip-flop 228. Once the flip-flop 228 is turned off the shift right process operation is stopped.

Outputs of the flip-flops 243 and 244 and the outputs of the flip-flops 245 and 246 are transmitted through or gates 251 and 252, respectively, to an inverter 253 which provides an inhibit gate signal having the wave form K, FIGURES 11 and 12, to an inhibit circuit 255 to prevent operation of the arithmetic section during the 16th shift right pulse since they are only 15 bits of data fed into the arithmetic section from the 15 bit registers, and the 16th shift pulse would cause an erroneous output.

The transmission of the output of the arithmetic section to the base register at the end of the base period of time Tt and to the output register 164 at the end of the load period of time Lt, as well as the recirculation of the data from the base register back into the base register at the end of the load period of time, is controlled by a gating circuit which includes a flip-flop 260 to one input terminal 261 of which is transmitted the output of the flip-flop 201 and to whose other input terminal 262 is transmitted the output of the one shot multivibrator 185. The flip-flop 260 is turned on, when the switch 85 is momentarily opened, by the output of the flip-flop 201 and is turned off at the beginning of the base period of time Tt when the switch 93 is momentarily opened by the output of the and gate 264 transmitted to its reset terminal 262. During the base period of time the output of the one shot multivibrator transmitted to one input terminal of the and gate 264, to whose other input terminal is transmitted the 100 kilocycle output of the clock 170, causes the and gate 264 to transmit 100 kilocycle signals not only to the reset terminal 262 of the flip-flop 260 but also to the reset terminals 273 and 273a of the base and output registers, respectively, and causes these registers during the base period Tt to be reset to zero. As a result, at the end of Tt a zero digital value is stored in the base register and the subtracter 159 after Tt will subtract zero from the minimum digital value so that the output of the subtracter 159, during the operation of the arithmetic section after Tt, will be Min. T. — 0 or Min. T. At the end of Tt, the output from one output terminal 265 of the flip-flop 260 transmitted to the input terminal 266 of an and gate 267 permits the output of the arithmetic section, which is transmitted to the other input terminal 268 of the and gate 267 to be transmitted through the and gate 267, an or gate 269 and an inverter 270 to the input terminals 271 and 272 of the base register to be inserted into the base register.

At the end of the load period of time Lt, the output of the flip-flop 260 transmitted to the input terminal 274 of an and gate 275 causes the output of the arithmetic section transmitted to the input terminal 276 of the and gate, to be transmitted through the and gate 275 and an inverter 277 to the input terminals 278 and 279 of the output register 164. Also, at the end of the load period of time Lt, the output of the flip-flop 260 is transmitted to one input terminal 281 of an and gate 282, to whose other input terminal 283 is transmitted the output of a delay flip-flop 284 which in affect adds a sixteenth flip-flop to the fifteen flip-flop base register. The data stored in the base register is recirculated through the and gate 282, the or gate 269 and the inverter 270 back to the input terminals 271 and 272 of the base register. The additional flip-flop 284 causes the base data to be recirculated back to its original position in the register after the arithmetic process is completed.

A flip-flop 285, turned on at the end of an arithmetic process after Lt but not after Tt by the flip-flop 246, its input terminal 286 being connected to the output terminal of the flip-flop 246, provides a pulse output, having the waveform J illustrated in FIGURES 11 and 12, which turns on a flip-flop 288 ten micro-seconds after the end of the arithmetic process, its output being transmitted to one input terminal 289 of the flip-flop 288. The flip-flop 260, which when it is turned on transmits a signal to the flip-flop 285 which permits it to be turned on by the output of the flip-flop 246, is turned on at the beginning of Lt and is turned off at the beginning of Tt. The flip-flop 288 at its terminal 290 provides a data entry signal, having the waveform K, which is transmitted to an input terminal 291 of the output counter and to an input terminal 292 of the flip-flop 294, only after Lt and not after Tt. The flip-flop 288 is turned off by the last flip-flop of the output counter which provides an output pulse to the input terminal 295 of the flip-flop 288. The output of the flip-flop 294 which is turned on ten microseconds after the data from the output register has been transferred into the output counter provides a system read out control pulse signal having the wave form L, FIGURE 12, during the read out of the output counter to the recorder. The system read out output at the input terminal 296 is transmitted through an or gate 297 to a terminal 298 of the output counter. The output from the terminal 296 of the flip-flop 294 and from the output terminal 290 of the flip-flop 288 are transmitted to input terminals of the flip-flop 300 whose output, as well as the output of the or gate 297, is transmitted to an or gate 301 whose output having the wave form M, FIGURE 12, is transmitted to the output counter. The flip-flop 300 is turned on ten microseconds after the flip-flop 294 is turned off and is turned off ten microseconds after the read out process has been completed, its output, having the wave form N, causing one of the count pulses of the output counter input to be deleted from the data read out since the number of input counts required to bring the output counter to zero is one more than the data clocked into it. As a result, after the deletion of one of the count pulses of the control system pulse output to the output counter has the wave form O, illustrated in FIGURE 12. Since the flip-flops 234, 288 and 294 are clocked by the 100 kilocycle output of the clock the functions of the arithmetic section, the output register and the output counter are performed at a 100 kilocycle rate.

In use, the clock 170 runs continuously providing the 800 kilocycle, 100 kilocycle and 50 kilocycle outputs. As the wheels roll over the approach rails, the switch 93 is momentarily opened and the output of the and gate 264 turns off the flip-flop 260 to prevent transmittal of the output of the arithmetic section to the output register at the end of the base Tt period of time and also resets the base and output registers to zero. Simultaneously, the output of the one shot multivibrator causes an input signal having the wave form D to be transmitted to the flip-flop 182 and the output of the flip-flop 182 having the wave form E causes the output of the analog-to-digital computer to be inserted in the input register during the periods d and the output of the flip-flop 210 having the wave form F causes the data stored in the input, maximum and minimum registers to be shifted left to the comparators during the DE periods of time between the d periods. At the end of the output of the one shot multivibrator, and therefore the end of Tt, the flip-flop 182 is turned off, the flip-flop 220 is reset by the first 50 kilocycle pulse received after the end of the output of the one shot multivibrator and causes the flip-flop 228 to be turned on. This in turn permits the 100 kilocycle output of the clock to be transmitted through the and gate 230 to the flip-flop 234 which now produces sixteen shift right pulses. The shift right pulses are transmitted to the four registers of the apparatus and cause the data in the base, minimum and maximum registers to be shifted to the arithmetic section in the manner described. Simultaneously, the shift right signals shift in zeros into the maximum register and ones into the minimum register. Since the and gate 275 is now closed, the shift right signals transmitted to the output register have no effect thereon and the output register remains set at zero. The or gates 251 and 252 provide an inhibit signal to the inhibit circuit 255 of the arithmetic section during the sixteenth shift right pulse. Since the flip-flop 260 is now turned off, the output of the arithmetic section (Min. T−0) is transmitted through the and gate 267, the or gate 269 and the inverter 270 to the base register where it is stored until the end of a Lt period of time.

When the switch 85 is then momentarily opened, the flip-flop 260 is turned on to permit the ouput of the arithmetic section to be transmitted to the output register at the end of the Lt period of time. The output of the flip-flop 201 between the successive openings of the switches 85 and 85a permits the 50 kilocycle output of the clock to be transmitted through the and gate 203 and the or gate 194 to the flip-flop 182 to cause the output of the analog-to-digital converter to be inserted into the input register and the data in the maximum and minimum registers to be compared with the data in the input register in the manner previously described. At the end of the Lt period of time, the flip-flop 228 is again turned on and the flip-flop 234 again produces sixteen shift right pulses to the registers and the output of the arithmetic section, since the flip-flop 260 is now set on, is transmitted through the and gate 275 and the inverter 277 to the output register. Simultaneously, the data in the base register is recirculated through the delay flip-flop 284, the and gate 282, the or gate 269 and the inverter 270 back into the base register.

After the Lt period of time and upon the termination of the arithmetic process, the flip-flop 285 is turned on and then is turned off ten microseconds later, J, FIGURE 12. The flip-flop 288 is turned on when the flip-flop 285 is turned off, K, FIGURE 12, and is turned off at the end of the data read out by the signal pulse output of the last flip-flop of the output counter. The signal from the flip-flop 294, L, FIGURE 12, which is turned on ten microseconds after data has been transferred into the output counter, is turned off at the end of the data read out, enables the count input gate of the output counter. The output of the flip-flop 300, N, FIGURE 12, which is turned on ten microseconds after the flip-flop 294 is turned on and is turned off ten microseconds after the read out has been completed, causes the deletion of one of the count pulses of the input to the output counter so that the pulse input to the output counter, which causes it to count forward to zero and provides an output pulse train to the recorder which corresponds to the data in the output register and to the true weight of the load sensed by the sensing circuit, has the wave form O illustrated in FIGURE 12.

Figure 13:
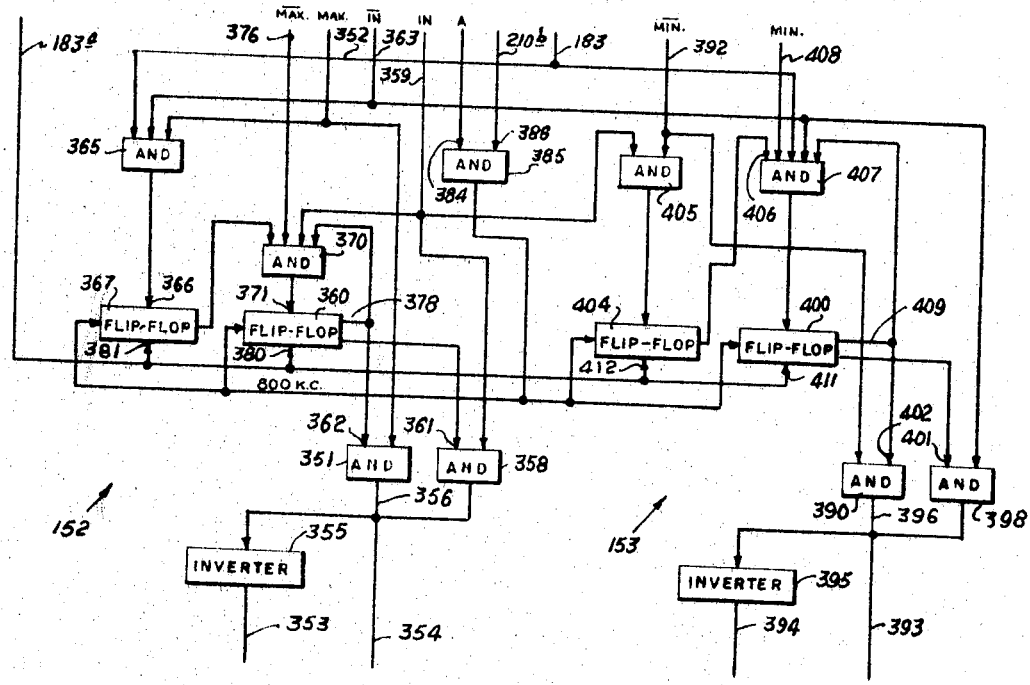
FIGURE 13 is a schematic block diagram of the comparator.

Referring now particularly to FIGURE 13 of the drawings, the comparator 152, which recirculates the data from the maximum register 154 back to the maximum register if it is greater than the data stored in the input register and which replaces the data stored in the maximum register with the data in the input register if the input register data is greater than the maximum register data, includes an and gate 351 through which the data from the output terminal 352 of the maximum register is transmitted to the input terminals 353 and 354 of the maximum register, an inverter 355 being connected between the output terminal 356 of the and gate and the input terminal 353. The comparator also includes an and gate 358 through which the input data from the output terminal 359 of the input register is transmitted to the maximum register input terminals 353 and 354 when the input register data is greater than the maximum register data.

The flip-flop 360 controls the operation of the and gates 351 and 358 and is set to provide an output signal to the input terminal 361 of the and gate 358, if the data in the input register is greater than in the maximum register, to open the and gate 358 and permit it to transmit the input register data to the maximum register. The flip-flop 360 when it is not set transmits an output signal to the terminal 362 of the and gate 351 to open the and gate and permit it to transmit the maximum register data back to the maximum register.

The output at the terminal 183 of the flip-flop 182, the output of the maximum register 352 at the terminal 352 and the output of the input register at its output terminal 353 are transmitted to input terminals of an and gate 365 which transmits a control signal pulse to the set input terminal 366 of the flip-flop 367 at the beginning of a data entry period of time DE if the most significant data bit from the maximum register is greater than the most significance data bit from the input terminal. The flip-flop 367 when it is not set sends a signal to an input terminal of an and gate 370 to permit it to transmit a set signal to the set input terminal 371 of the flip-flop 360 at the beginning of each data entry period of time DE. The three other input terminals of the and gate 370 are connected to the output terminal 376 of the maximum register, the output terminal 359 of the input register and the output terminals 378 of the flip-flop 360 so that the flip-flop 360 will be set only during the periods of time when the flip-flop 367 is not set at the beginning of a data entry period of time DE when the data in the input register is greater than the data in the maximum register. The comparator 152 operates only during the data entry periods of time DE since the flip-flops 360 and 367 are reset at the end of each data entry period of time by the output at the output terminal 183a of the flip-flop 182 which is transmitted to their reset input terminals 380 and 381, respectively, since the 800 kilocycle output of the clock from its output terminal 172 is transmitted to one input terminal 384 of an and gate 385 to whose other input terminal 386 is transmitted the output from the output terminal 210b of the flip-flop 210, and since the and gates 365 and 370 can be open only during the data entry periods of time DE.

It will now be apparent that during the beginning of each period of time DE, the flip-flop 367 is set by a pulse transmitted to its set input terminal 366 if the most significant data bit from the maximum register is greater than the most significant data bit from the input register, and that once the flip-flop 367 is set it prevents or disables the flip-flop 360 from being set even if a succeeding data bit from the input register is greater than the corresponding data bit from the maximum register during a prticular data entry period of time. As a result, during such data entry period of time DE, the data from the maximum register is circulated through the and gate 351 to the input terminals 353 and 354 of the maximum register, the and gate 351 now being open and the and gate 358 now being closed. At the end of such data entry period of time, the flip-flops 360 and 367 are reset by the output of the flip-flop 182 at its output terminal 183a.

At the beginning of a data entry period of time, when the data in the input register is greater than the maximum register, no set signal will be transmitted to the set input terminal 366 of the flip-flop 367 and a set signal will be transmitted to the set input terminal 371 of the flip-flop 360 which will then open the and gate 358 and close the and gate 351 so that the data from the input register will be transmitted through the open and gate 358 to the input terminals 353 and 354 of the maximum register. The flip-flop 360 will then remain set during such data entry period of time until at the end thereof a reset signal is again applied to its reset terminal 180.

The comparator 153 operates in a similar manner to the comparator 152 and includes an and gate 390 through which the data from the output terminal 392 of the minimum register is recirculated to the input terminals to its input terminals 393 and 394, an inverter 395 being connected between the output terminals 396 of the and gate 390 and the input terminal 394 if the data from the minimum register is smaller than the data from the input register. The comparator also includes an and gate 398 through which the data from the output terminal 363 of the input register is transmitted to the minimum register input terminals 393 and 394 if the data from the input register is smaller than the data from the minimum register. A flip-flop 400 controls the operation of the and gates 390 and 398 and is set to provide an output signal to the input terminal 401 of the and gate 398 to open the and gate 398 if the data in the input register is smaller than the data in the minimum register, and when it is not set transmits an output signal to the input terminal 402 of the and gate 390 to open the and gate when the data in the minimum register is smaller than the data in the input register.

A flip-flop 404 is set by the output of an and gate 405 at the beginning of each data entry period of time DE if the most significant data bit from the minimum register is smaller than such data bit from the input register to prevent the flip-flop 400 from being set, the output terminal 392 of the minimum register being connected to one input terminal of the and gate 405 and the output terminal 359 of the input register being connected to the other input terminal of the and gate 405. The output of the flip-flop 404 when it is not set is transmitted to the input terminal 406 of an and gate 407. The other input terminals of the and gate 407 are connected to the output terminal 408 of the minimum register, the output terminal 183 of the flip-flop 182, the output register terminal 363 and the output terminal 409 of the flip-flop 400. The flip-flops 400 and 404 are reset by the output of the flip-flop 182 whose output terminal 183a is connected to the reset input terminals 411 and 412 of the flip-flops 400 and 404 and the clock input terminals of the flip-flops 400 and 404 have applied thereto the 800 kilocycles output of the clock during the periods of time DE.

It will now to been that the comparators operate during the data entry periods of time DE to recirculate the data from the maximum register back to the maximum register, if it is greater than the data inserted into the input register during the immediately preceding period of time d, FIGURE 10, E, to insert the data from the input register into the maximum register if it is greater than that previously in the maximum register, to recirculate the data in the minimum register back into the minimum register if the data inserted into the input register during the preceding period of time is greater than that in the minimum register and to insert the data from the input register into the minimum register if it is smaller than that previously in the minimum register.

Figure 14:
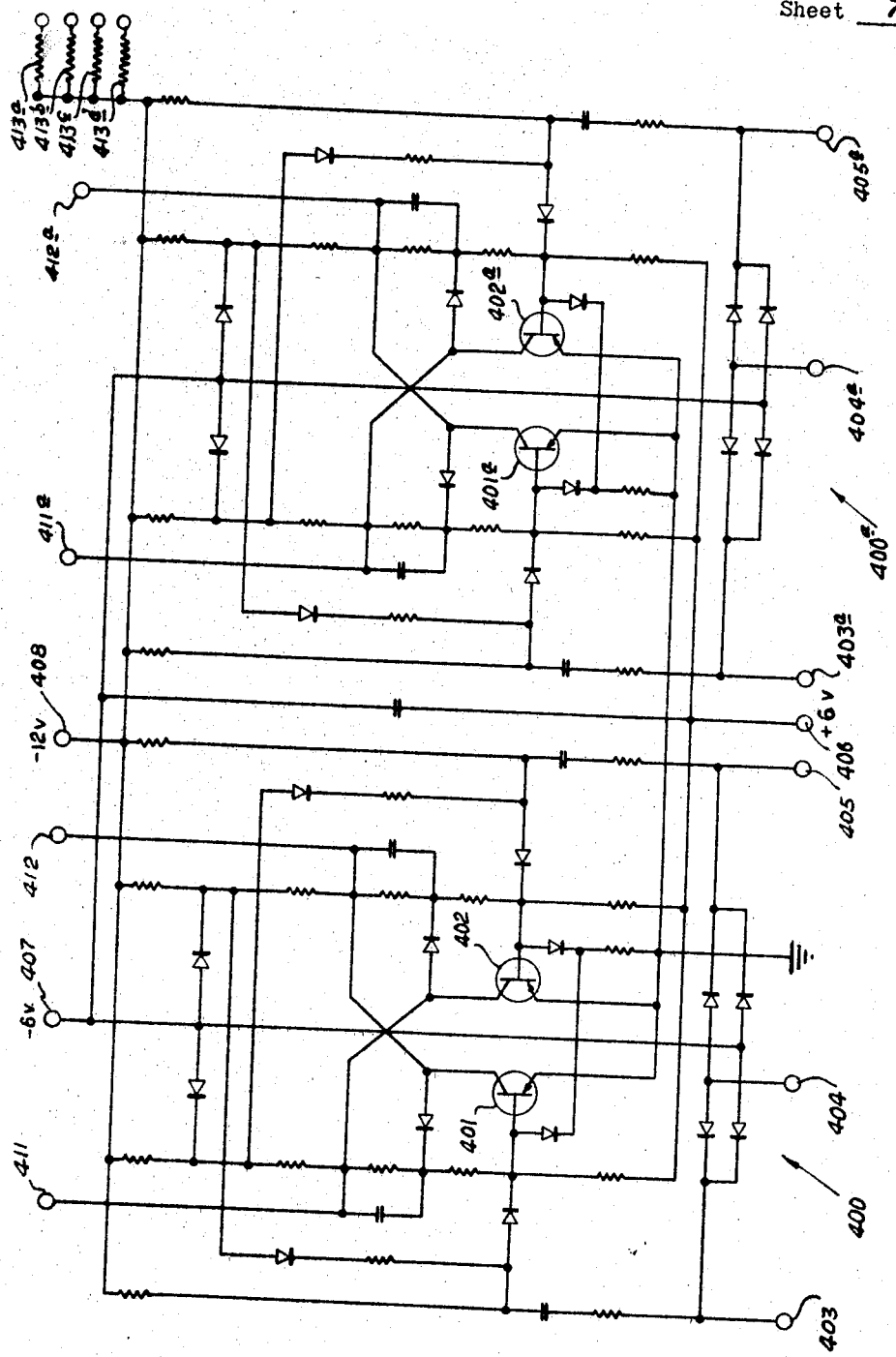
FIGURE 14 is a schematic illustration of a pair of flip-flops of one type used in the apparatus.

The various components of the apparatus, such as the flip-flops, the and gates and the or gates may be of any suitable well known types and preferably are direct coupled transistor logic circuits. For example, if the flip-flops 400 and 400a, FIGURE 14, are connected to the flip-flops 176 and 177, respectively, and therefore, each operate as a N/2 binary counter, the input from the 800 kilocycle multivibrator 175 is applied to the clock input terminal 404 of the flip-flop 400 whose set input terminal 403 is connected to its reset input terminal 405 and to the terminal of one of the gate resistors 413. The 400 kilocycle output at the output terminal 412 of the transistor 400 is then transmitted to the clock input terminal 404a of the flip-flop 400a whose set input terminal 403a is then similarly connected to its reset input terminal 405a and to the terminal of another of the gate resistors 413. The 200 kilocycle output at the terminal 412 is then in this case transmitted to the and gate 179.

Figure 9:
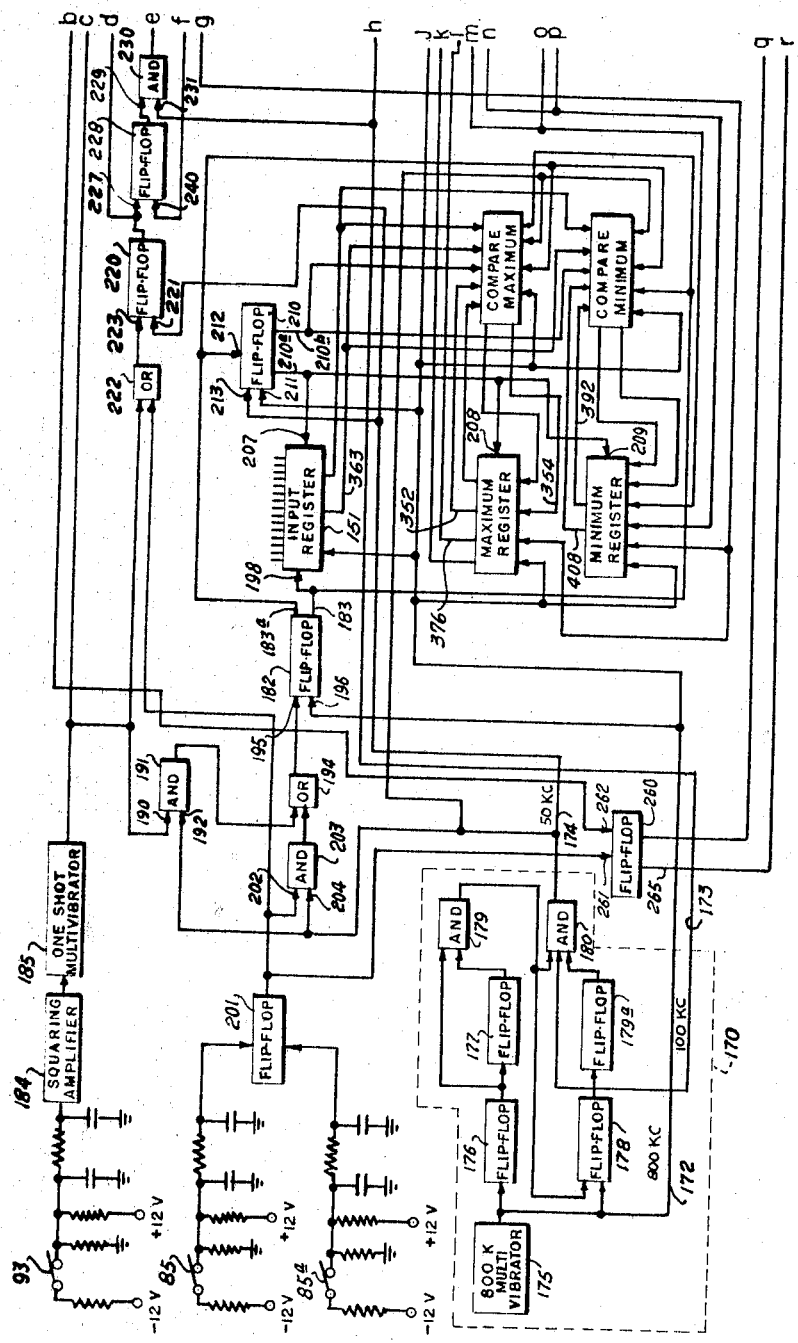
FIGURE 9 is a block diagram of the control section of the overall circuit.

If the flip-flop 400 is to be used to provide control or gate signals, for example, if it is to be used as the flip-flop 182 which provides the signal output having the wave form E, FIGURE 10, at one output terminal 411 and the obverse thereof at its other output terminal 412, the 800 kilocycle output is transmitted to its clock input terminal 404 and the 50 kilocycle pulse output from the or gate 194 is transmitted to its set input terminal 403, which in FIGURE 9 is identified as the terminal 195.

If a flip-flop 400 is to be used as the flip-flop 234 which provides an output having the wave form I shown in FIGURE 11, the 800 kilocycle clock output is transmitted to its set input terminal 403 through the and gate 235 and the 100 kilocycle clock output is transmitted to reset input terminal 405 through the and gate 230, to which its output terminal 411 is connected, so that the output at its output terminal 412 has the wave form I illustrated in FIGURE 11.

It will thus be apparent that the flip-flops 400 and 400a may be connected either to function as binary counters or to provide control or gate signals to other components of the apparatus.

Figure 15:
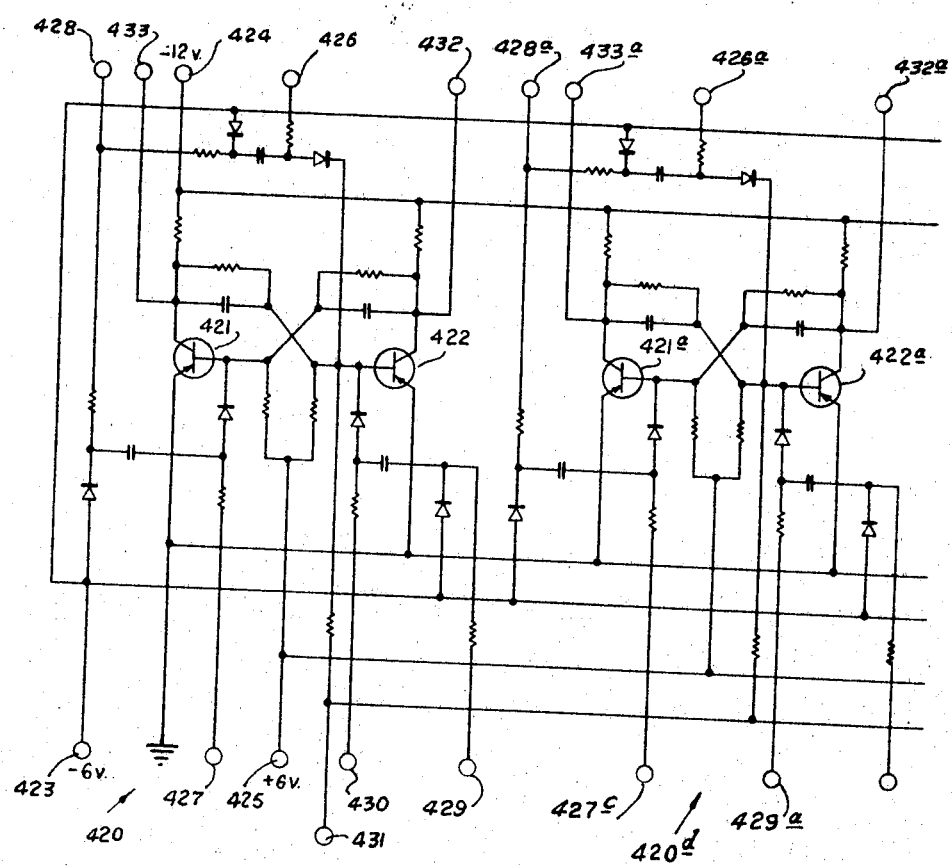
FIGURE 15 is a schematic illustration of a pair of flip-flops of another type used in the apparatus; and, FIGURE 16 is a schematic block diagram of a modified arithmetic section useable in the apparatus which subtracts one-half the difference between the maximum and minimum values of the signal voltage from the maximum value to obtain its median value.

In FIGURE 15 are illustrated another pair of identical flip-flops 420 and 420a having both serial and parallel set and reset capabilities which may be used to provide control or gate signals or which may be used as components of the output register, the divider 242 or the output counter. The flip-flops 420 has a pair of transistors 421 and 422, negative input voltage terminals 423 and 424, a positive voltage input terminal 425, serial set and reset input terminals 426 and 427, respectively, a serial pulse input terminal 428, a parallel set pulse input terminal 429, a parallel set input terminal 430, a direct reset terminal 429, and output terminals 432 and 433. The flip-flop 420a is identical to the flip-flop 420 and, accordingly, its elements have been provided with the same reference numerals, to which the subscript "a" has been added, as the corresponding elements of the flip-flop 420. The two flip-flops are shown as having common voltage input terminals and a common direct reset terminal.

If, for example, the flip-flops 420 are connected to form the output register, the output of the flip-flop 234, having the wave form I, FIGURE 11, would be transmitted simultaneously to the serial pulse input terminals, such as the terminals 428 and 428a of such flip-flops, the output of the or gate 264 would be transmitted to the direct reset terminal 431, the output from the base register would be transmitted to the serial set terminal 426 and the serial reset terminal 427 of the first flip-flop. The output terminal 432 of each output register flip-flop would be connected to one of the parallel output lines of the output register 433 and would also be connected to the serial reset input terminal, such as the reset terminal 427a, of the next flip-flop of the output register. The other output terminal 433 of such first flip-flop would, of course, be connected to the serial set terminal 426a of the next flip-flop. The second flip-flop of the output register would be similarly connected to its third flip-flop so each of the flip-flops of the output register thus providing one of the output lines 434 to corresponding flip-flops of the output counter.

The flip-flops 420 may also be used as the flip-flops of the binary N/16 counter 242. In this case, the output of the flip-flop 234 is transmitted to the serial pulse input terminal 428 of the first such flip-flop 243, the direct reset terminal 431 of the four flip-flops of the binary counter 242 would be grounded, the output terminal 432 of the flip-flop 243 would be connected to its own serial set terminal 426 and to the serial pulse input terminal 428 of the next flip-flop 244. The other output terminal 433 of such first flip-flop 433 would be connected to its own serial reset terminal 427 and to one terminal of the or gate 251. The other three flip-flops 244, 245, and 246 would similarly be connected to one another, the output terminal 433 of the flip-flop 244 being connected to the or gate 251 and one output terminal 433 of the flip-flops 245 and 246 being connected to the or gate 252. The output at the terminal 432 of the last flip-flop 246 would, of course, be transmitted to the flip-flop 285 and the or gate 264 as explained above.

It will now be apparent that by use of well known DCTL circuits, the proper logic operations are performed to obtain the true or median value of a single voltage which is subject to perturbations.

Figure 16:
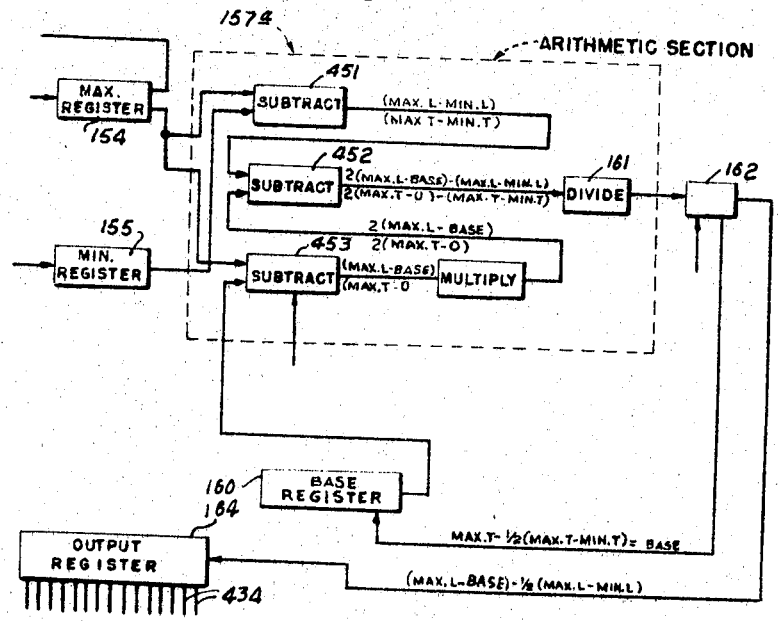

Referring now to FIGURE 16 of the drawing the modified form of arithmetic section 157a, which may be used in the apparatus instead of the arithmetic section 157 illustrated in FIGURE 8, provides the median values of the signal voltage during the base and load period of time by subtracting from the maximum values of the signal voltage during these period one-half of the different between the maximum value and the minimum value. The arithmetic section 157a includes a first subtracter 451 to which after the base period of time Tt the maximum base data Max. T. and the minimum base data Min. T. stored in the maximum and minimum registers, respectively, during the base period of time are transmitted. The first subtracter subtracts the minimum base data from the maximum base data and this output (Max. T.—Min. T.) of the first subtracter is transmitted to a second subtracter 452. Also after the base period Tt, the data from the base register 160, which is of zero value, is subtracted by a third subtracter 453 from the maximum value or data Max. T. stored in the maximum register during the base period so that upon termination of the base period, the output of the third subtracter 453 is the value (Max. T.—0). The output of the third subtracter is transmitted to a multiplier 160 where it is multiplied by two and the output of the multiplier 2 (Max. T.—0) is transmitted to the second subtracter. The output of the first subtracter (Max. T.—Min. T.) is and the output of the second subtracter T.—Min. T.) is subtracted from the output of the multiplier 2 (Max. T.—0) and the output of the second subtracter 2 (Max. T.—0)—(Max. T.—Min. T.) is transmitted to the divider where it is divided by two. The output of the divider Max. T.—½(Max. T.—Min. T.) is transmitted through the control 162 to the base register 160. As a result immediately prior to the actuation of the switch 85, which starts the load period of time, the base register stored therein a digital value which corresponds to the base or median value of the voltage output of the sensing circuit.

Upon the subsequent actuation of the switch 85a which ends the load period LT, the data in the minimum register Min. L is subtracted by the subtracter 451 from the data Max. L stored in the maximum register and the output of the subtracter 451 is transmitted to the second subtracter 452. Simultaneously, the data in the base register BASE is subtracted by the third subtracter 453 from the data from the maximum register Max. L and the result of this transaction (Max. L—BASE) is transmitted to the multiplier 160 which multiplies it by two. The output of the multiplier 160 2(Max. L—BASE) is transmitted to the second subtracter 452 wherein the data from the first subtracter (Max. L—Min. L) is subtracted therefrom. The output of the third subtracter 451 2(Max. L—BASE)—(Max. L—Min. L) is then transmitted to the divider 161 which divides it by two. The output of the divider (Max. L—BASE)—½(Max. L—Min. L) is transmitted to the output register. It will thus be apparent that by the use of the arithmetic section 157a, instead of the arithmetic section 157, in the above described apparatus, the median or true value of the signal voltage output of the sensing circuit is obtained by subtracting one-half of the difference between the maximum and minimum digital values of the voltage output during the base and load periods of time from the maximum values. The use of the arithmetic section 157 is, however, preferred since the output of the multiplier in the case of the arithmetic section 157a at the end of the load period of time 2(Max. L—BASE) could be in some instances a relatively large bit number and this would require additional complexities of circuitry to prevent data spillage.

It will now be apparent that a new and improved apparatus for obtaining the true value of a signal voltage produced by any suitable device, such as the sensing circuit of a weighing apparatus, has been illustrated and described which obtains the median value of the voltage during the period of time as at least as long as one cycle of any extraneous perturbations to which the signal voltage may be subject either by subtracting one-half of the difference between the maximum and minimum values of the signal voltage during such period of time from the maximum value or adding one-half of the difference to the minimum value.

The foregoing description of the invention is explanatory only, and changes in the details of the construction illustrated may be made by those skilled in the art.

What is claimed and desired to be secured by Letters Patent is:

1. An apparatus for determining the true value of a signal voltage subject to extraneous perturbations, said apparatus including: first means for determining the maximum value of said signal voltage during a predetermined period of time at least as long as one cycle of said perturbations; second means for determining the minimum value of said signal voltage during said predetermined period; third means operatively associated with said first and second means for obtaining a value equal to said minimum value plus one-half of the difference between said maximum value and said minimum value, said third means including means for subtracting said minimum value from said maximum value and means for adding one-half the difference between said minimum value and said maximum value to said minimum value; converter means for continuously converting the analog value of said signal voltage into digital data during said predetermined period of time; and fourth means for transmitting the output of said converter, means periodically to said first and second means during said predetermined period of time, said first means including a maximum register and a maximum digital data comparator for periodically comparing the digital data output of said converter means during said predetermined period of time with the digital data previously stored in said maximum register and for replacing the data previously stored in said maximum register with the digital data output of said converter means if the output of the converter means is greater than the digital data previously stored in said maximum register, said second means including a minimum register and a minimum digital data comparator for periodically comparing the digital data output of said converter means during said predetermined period of time with the digital data previously stored in said minimum register and for replacing the data previously stored in said minimum register with the digital data output of said converter means if the output of the converter means is smaller than the digital data previously stored in said minimum register.

2. The apparatus of claim 1, and an output register, means for transmitting the output of said third means to said output register, a recording means, and an output counter for transmitting the data from the ouput register to said recording means.

3. The apparatus of claim 2, and control means for controlling operation of said first, second and third means, said output register, said output counter and said recording means to cause the output of said converter means to be compared with the data in the maximum and minimum registers periodically during said predetermined period of time between said data entry periods, and to cause data from said maximum and minimum registers to be transmitted to said third means.

4. An apparatus for determining the true value of a signal voltage subject to extraneous perturbations, said apparatus including: first means for determining the maximum value of said signal voltage during a predetermined period of time at least as long as one cycle of said perturbations; second means for determining the minimum value of said signal voltage during said predetermined period; third means operatively associated with said first and second means for obtaining a value equal to said minimum value plus one-half of the difference between said maximum value and said minimum value; converter means for continuously converting the analog value of said signal voltage into digital data during said predetermined period of time; fourth means for transmitting the output of said converter means periodically to said first and second means during said predetermined period of time, said fourth means comprising an input register; and means for inserting the output of said converter means into said input register periodically during short data entry periods of time during said predetermined period of time and for transmitting periodically the data in said input register to said first and second means during said predetermined period of time between said data entry periods of time.

5. The apparatus of claim 4, wherein said first means includes a maximum register and a maximum digital data comparator for periodically comparing the digital data output of said converter means during said predetermined period of time with the digital data previously stored in said maximum register and for replacing the data previously stored in said maximum register with the digital data output of said converter means if the output of the converter means is greater than the diigtal data previously stored in said maximum register, said second means including a minimum register and a minimum digital data comparator for periodically comparing the digital data output of said converter means during said predetermined period of time with the digital data previously stored in said minimum register with the digital data output of said converter means and for replacing the data previously stored in said minimum register with the digital data output of said converter means if the output of the converter means is smaller than the digital data previously stored in said minimum register.

6. The apparatus of claim 5, and an output register, means for transmitting the output of said third means to said output register, a recording means, and an output counter for transmitting the data from the output register to said recording means.

7. A weighing apparatus for weighing a moving load including: a beam supported at longitudinally spaced locations whereby said beam is free to deflect downwardly as a load moves longitudinally over said beam; means for sensing the deflection of said beam at points spaced longitudinally along said beam and between said spaced locations, said sensing means providing a signal voltage as a load moves longitudinally over said beam which varies in accordance with the weight of the load; first means for determining the maximum value of said signal voltage as the load moves over a predetermined longitudinal portion of said beam between said spaced locations; second means for determining the minimum value of said signal voltage during the movement of said load over said predetermined portion of said beam; and third means operatively associated with said first and second means for obtaining a signal voltage equal to said minimum value plus one-half of the difference between said maximum value and said minimum value.

8. The weighing apparatus of claim 7, wherein said apparatus includes means for determining the median base value of said signal voltage during a predetermined period of time immediately preceding the movement of a load onto the beam, said last mentioned means including said first, second and third means and means for transmitting said signal voltage to said first and second means during said predetermined period of time; and means for subtracting said base value from said value of said signal voltage provided by said third means after the movement of the load over the beam.

9. The apparatus of claim 7, wherein said apparatus includes converter means for continuously converting the analog value of said signal voltage into digital data, fourth means for transmitting the output of said converter means to said first and second means periodically during short data entry periods of time as said load moves over said predetermined portion of said beam.

10. The apparatus of claim 9, wherein said first means includes a maximum register and a maximum digital data comparator for comparing the digital data output of said converter between said data entry periods with digital data previously stored in said maximum register and for replacing the data previously stored in said maximum register with the digital output of said converter means if the output of said converter means is greater than the digital data previously stored in said maximum register, said second means including a minimum register and a minimum digital data comparator for comparing the digital data output of said converter means between said data entry periods with digital data previously stored in said minimum register and for replacing the data previously stored in the minimum register with the digital data output of said converter means if the output of the converter means is smaller than the digital data previously stored in said minimum register.

11. The apparatus of claim 10, and an output register; means for transmitting the output of said third means to said output register; a recording means; and an output counter for transmitting the data from the output register to said recording means.

12. The apparatus of claim 11, and control means for controlling the operation of said first, second and third means, said output register, said output counter and said recording means to cause the output of said converter means to be compared with data in the maximum and minimum registers periodically as the load moves over said predetermined portion of said beam and to cause data from said maximum and minimum registers to be transmitted to said third means after the load has moved over said predetermined portion of said beam.

13. A weighing apparatus for weighing a moving load including: a beam supported at longitudinally spaced locations whereby said beam is free to deflect downwardly as the load moves longitudinally over said beam; means for sensing the deflection of said beam between said spaced locations, said sensing means providing a signal voltage as a load moves longitudinally over said beam which varies in accordance with the weight of the load; first means for determining the maximum value of said signal voltage as the load moves over a predetermined longitudinal portion of said beam between said spaced locations; second means for determining the minimum value of said signal voltage during the movement of said load over said predetermined portion of said beam; and third means operatively associated with said first and second means for obtaining the median value of said signal voltage during the movement of said load over said predetermined portion of said beam.

14. The weighing apparatus of claim 13, wherein said apparatus includes means for determining a median base value of said signal voltage during a predetermined period of time immediately preceding the movement of a load onto the beam; and means for subtracting said median base value from said median value to obtain the value of said signal voltage which varies in accordance with the weight of the load.

15. The weighing apparatus of claim 14, wherein said means for determining the median base value includes said first and second means to which the output of said sensing means is transmitted during said predetermined period of time, and said third means which determines said median base value.

References Cited

UNITED STATES PATENTS

| | | | |
|---|---|---|---|
| 2,869,853 | 1/1959 | Pratt | 177—211 X |
| 2,974,863 | 3/1961 | Williams et al. | 177—210 X |
| 3,101,800 | 8/1963 | Raskin. | |
| 3,155,184 | 11/1964 | Raskin | 177—211 X |
| 3,182,181 | 5/1965 | Schumann | 328—151 X |
| 3,192,535 | 6/1965 | Watson | 177—211 X |

RICHARD B. WILKINSON, *Primary Examiner.*

G. H. MILLER, Jr., *Assistant Examiner.*

U.S. Cl. X.R.

177—163, 211; 307—218, 247, 292; 324—65; 328—135